Oct. 9, 1951        W. A. JOERNDT        2,570,814
WAVE GUIDE ATTENUATOR
Filed Oct. 8, 1949        2 Sheets-Sheet 1
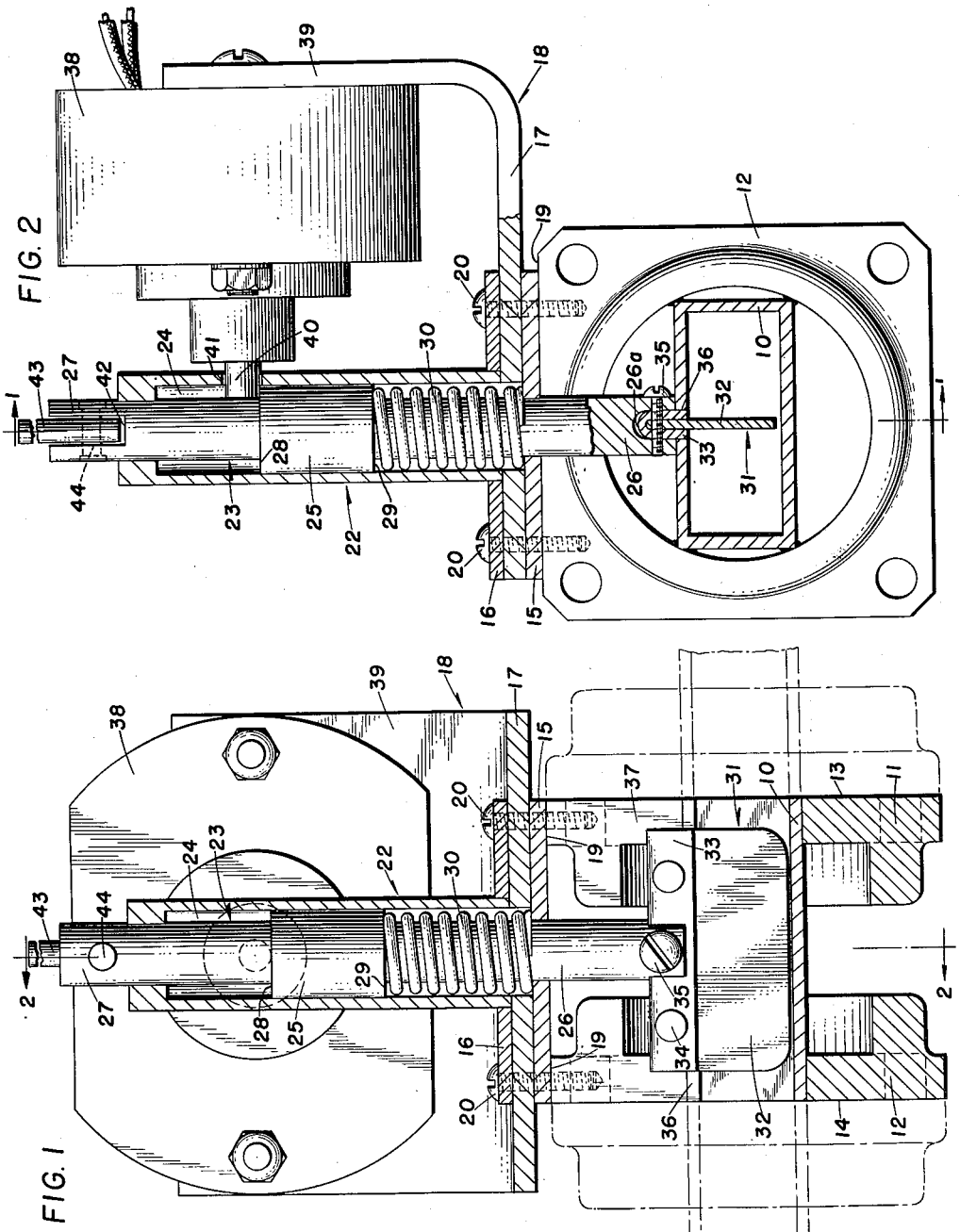
INVENTOR.
WILBUR A. JOERNDT
BY
ATTORNEY

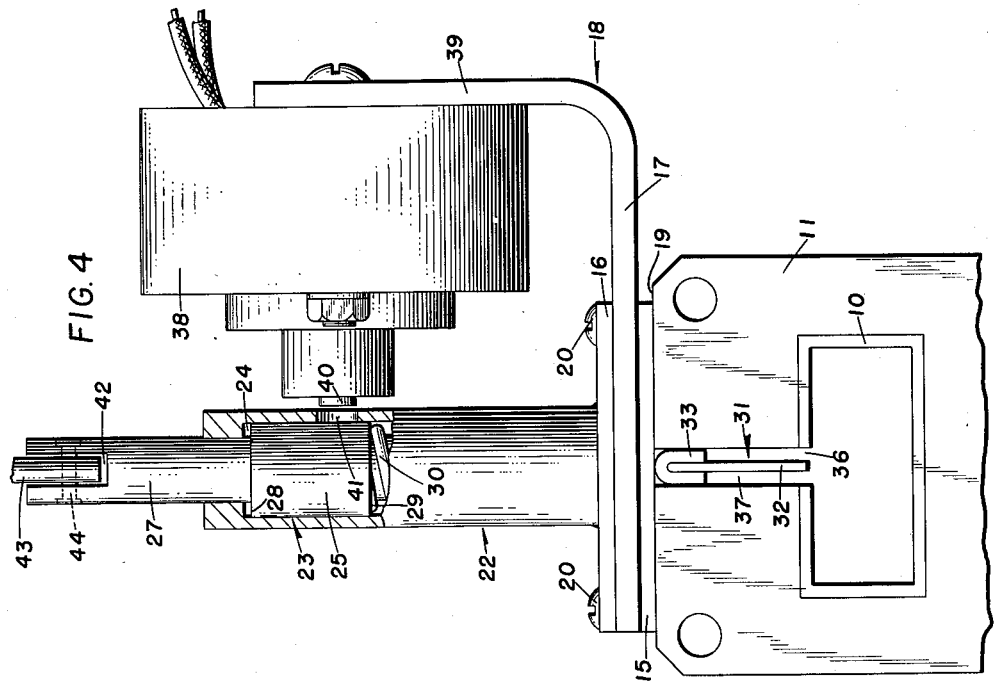
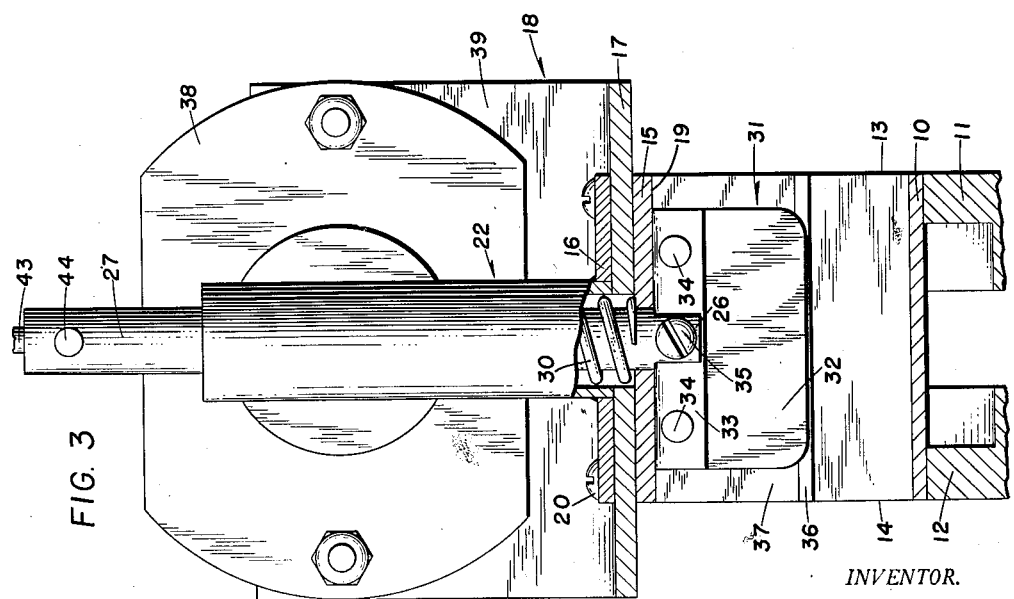

Patented Oct. 9, 1951

2,570,814

UNITED STATES PATENT OFFICE 2,570,814

WAVE GUIDE ATTENUATOR

Wilbur A. Joerndt, Silver Spring, Md., assignor to the United States of America as represented by the Secretary of the Navy Application October 8, 1948, Serial No. 53,543

4 Claims. (Cl. 250—20)

The present invention relates to improvements in wave guide attenuators and more particularly to improvements in wave guide attenuators for use in connection with airborne vehicles. The invention is an improvement over that disclosed in co-pending application, Serial No. 53,542, filed October 8, 1948, of Wilbur A. Joerndt and Roland W. Larson, inventors. Specifically the invention relates to a wave guide attenuator for use with a radar receiver, mounted in a guided missile, which will insure a reduced received signal, from a radar transmitter, concurrent with the launching of the missile and a maximum signal immediately thereafter.

Many devices have been used in the past to protect the sensitive detector crystal of a radar receiver from damage from signals received in the immediate proximity of the signal source, these chiefly being devices for reducing the value of incoming signals at the launching of a guided missile and providing a subsequent gradual increase in signal amplitude as the missile leaves the vicinity of the radar transmitter. While these attenuators have enjoyed partial success they have not been entirely satisfactory in their operation or results.

In the control of certain guided missiles, a crystal detector is used to receive radar signals from a ground transmitter. This crystal detector is usually incorporated in a wave guide section on the inboard side of a lens type antenna or receiving horn, which is in turn mounted on the guided missile. To provide adequate control, signals from the ground transmitter to the detector crystal should be available concurrently with the launching of the missile. This received signal must be of such strength to control the flight of the missile at great distances, that when the missile is in the proximity of the transmitter, incident to launching, it is far too strong for the detector crystal and damage to said crystal is likely to occur. It follows, therefore, that incident to said launching, the signal strength must be reduced in order to prevent overloading of the detector crystal; however, due to the great acceleration of the missile, the received signal must be at its full strength shortly after launching.

An object of the present invention, therefore, is to provide simplified means for attenuating an input radar signal by reducing the amplitude thereof with respect to a receiving detector crystal. Another object is to provide means for attenuating strong radar signals entering a guided missile detector crystal while the said missile is in the vicinity of the transmitter. A further object is to provide a means for attenuating strong radar signals, from a transmitter to a recipient detector crystal located on a guided missile, incident to the launching of said missile and subsequently instantaneously removing the attenuating means when the missile has reached an adequate distance from the transmitter and thereby providing a control signal of full strength.

Other objects and many of the attendant advantages of this invention will be readily appreciated as the same becomes understood by reference to the following detailed description when considered in connection with the accompanying drawings, wherein:

Fig. 1 is an enlarged sectional view of a preferred form of apparatus embodying the invention, on the plane I—I of Fig. 2, partially in elevation and showing a cooperating wave guide in dash-dot lines;

Fig. 2 is an enlarged vertical section, on the plane 2—2 of Fig. 1, partially in elevation and showing the impeding element in its full attenuating position;

Fig. 3 is a front elevation, on an enlarged scale and partially in section, illustrating the device with the impeding element in its non-attenuating position; and Fig. 4 is an enlarged side elevation partially in section showing the invention in its non-attenuating position.

Referring now to the drawings in detail, solely by way of example, and more specifically to Fig. 1, there is shown a section of rectangular shaped wave guide 10, of an appropriate length, and secured thereon, as by brazing, are the conventional wave guide connecting flanges 11 and 12, positioned to provide smooth, or flush, end surfaces 13 and 14 respectively. A spacer plate 15, and a base plate 16, with the horizontal leg 17 of an angle bracket 18 interposed between them, are secured to the upper edges 19 of the wave guide connecting flanges 11 and 12, illustrated here as by screws 20.

Located centrally of and integral with the base plate 16, and supported thereby, is a tubular housing 22. A piston 23 is slidably disposed within the axial bore 24 of the housing 22 and has a central portion 25, and end shafts 26 and 27 of a reduced diameter and forming the shoulders 28 and 29 at the ends of said portion. A compression spring 30 is arranged within the bore 24 and surrounds the shaft 26 of the piston 23 with the lower end of said spring, suitably shaped, resting on the upper face of the spacer plate 15 and abutting at its upper end the shoulder 29 of the central body 25.

As best seen in Fig. 2, the lower piston shaft 26 is axially slotted at its lower extremity to receive the attenuating element 31, here comprising the blade portion 32, preferably fabricated from a material having an electrical resistance of approximately thirty ohms per square unit. However, for some applications this resistance may be increased or decreased in order to provide a higher or lower decibel value of attenuation, as desired. The element 31 also comprises a coping member or ferrule 33, attached to the said blade portion 32, as by flush rivets 34. The attenuating element 31 is held in the slot 26a of the shaft 26, as by the machine screw 35, and when the device is in its full attenuating position, as seen in Figs. 1 and 2, it extends down into the wave guide 10 through a slot 36 in the upper side thereof.

As clearly seen in Fig. 4, when the attenuating element 31 is in its non-attenuating position, fully withdrawn from the wave guide 10, it is received in the slot 37 provided in the wave guide flanges 11 and 12, and communicating with the slot 36 in said wave guide.

The piston releasing mechanism consists of a small solenoid 38 mounted on the vertical leg 39 of an angle bracket 18 so that, as shown in Fig. 2, when the solenoid is unenergized its plunger 40 extends through a hole 41 in the housing 22 and coacts with the upper shoulder 28 of the enlarged cylindrical body 25 of the piston 23 to retain the element 31 in its attenuating position within the wave guide 10.

The upper piston shaft 27 is slotted at 42 to receive an extension shaft 43, here shown fragmentarily, said shaft being secured within the slot by any convenient means, such as a rivet 44.

The above described device is installed in a guided missile's radar receiving system between the lens antenna or receiving horn and the detector crystal. The wave guide connecting flanges 11 and 12 coact with mating flanges within the system, as indicated in Fig. 1 by dash-dot lines.

In operation, the radar receiver, with the improved attenuator thereon, would be installed within the confines of the skin, or outer surface, of the guided missile with only the extension shaft 43 protruding therefrom. Prior to the firing of the missile the attenuator would be "triggered," or positioned in its full attenuating position, by simply pushing down on the extension shaft 43, overcoming thereby the spring 30, and allowing the solenoid plunger 40, which normally tends to move into the path of the piston 23 when unenergized to slip in above the shoulder 28 of the piston 23, thus locking the said piston with the resistance element 32 in its maximum attenuating position, as best seen in Fig. 2, extending fully down into the wave guide 10. Concurrently with the firing of the missile, the radar signal from the ground transmitter is of full length; however, the resistance element 32 within the wave guide 10 attenuates the signal prior to its reception by the detector crystal and thereby reduce its strength to a value that will not damage the said detector crystal.

Due to the high initial velocity of the missile on firing, a signal of full strength is immediately necessary for adequate control. In order to insure this full signal as soon after firing as required, the actuating solenoid 38 is energized, by the missile's power source (not shown), simultaneously with the firing of the missile. Upon energization of the solenoid 38 its plunger 40 is withdrawn from the housing 22, as seen in Fig. 4, whereby the spring powered piston instantly moves upward, instantaneously withdrawing the element 32 from the wave guide 10.

With the resistance element 32 completely removed from the wave guide, as illustrated in Figs. 3 and 4, the radar signal is free from attenuation, thereby allowing a signal of maximum strength to reach the detector crystal.

Obviously many modifications and variations of the present invention are possible in the light of the above teachings. It is therefore to be understood that within the scope of the appended claims the invention may be practiced otherwise than as specifically described.

I claim:

1. In a radar signal attenuator for a guided missile having a radar receiver with an antenna connected thereto, in combination, a wave guide section having a pair of connecting end flanges secured thereon, for interconnecting said wave guide section with said antenna, a piston housing, means for mounting said housing on said end flanges, a piston disposed within said housing, an attenuator element secured to one end of said piston and movable into and out of the wave guide section, means for urging said element into said wave guide section to attenuate a received signal while the missile is in close proximity to a radar transmitter, and means for instantaneously removing said element from the wave guide section immediately after launching said missile.

2. In combination with a radar receiver for a guided missile, a wave guide section having a slot therein, a pair of connecting end flanges secured on said wave guide section inter-connecting said section with the radio receiver in said guided missile, a piston housing, means for mounting said housing on said end flanges, a spring actuated main piston body disposed within said housing, a lower piston shaft of a diameter smaller than the said piston body and integral therewith, an attenuator element secured to the end of said shaft and insertable through the slot in the wave guide section to attenuate a received signal while the missile is in close proximity to a radar transmitter, and means for instantaneously withdrawing said element from the wave guide section immediately after launching said guided missile.

3. In a radar signal attenuator to be used between a receiving antenna and a crystal detector on a guided missile, a section of rectangular wave guide having a slot therein, a pair of connecting end flanges secured thereon, a piston housing, a mounting plate secured thereto, means for securing said plate to the said connecting end flanges, a piston slidably disposed within said housing and having a main body portion, an upper piston shaft of a diameter less than that of said main body portion and integral therewith and forming a shoulder thereon, a lower piston shaft of a diameter less than that of the said main body portion and integral therewith and providing a shoulder thereon, a spring surrounding said lower shaft and exerting an upward force thereon, an attenuator element secured to said shaft and insertable through the wave guide slot into said wave guide section, means for latching said element in its attenuating position while the missile is in the vicinity of a radar transmitter, and means for instantaneously removing said latching means immediately after the missile has left said vicinity.

4. In apparatus of the character described as recited in claim 3, wherein said attenuating element latching means includes an electrical solenoid, a plunger extending therefrom and engaging the upper shoulder of the spring pressed main body portion of said piston when the attenuating element is in its full attenuating position, and means for energizing said solenoid to disengage said plunger from said shoulder.

WILBUR A. JOERNDT.

REFERENCES CITED

The following references are of record in the file of this patent:

UNITED STATES PATENTS

| Number | Name | Date |
|---|---|---|
| 2,461,158 | Hollingsworth et al. | Feb. 8, 1949 |

OTHER REFERENCES

Practical Analysis of Ultra High Frequency, by J. R. Meagher and H. J. Markley, copyright 1943, 2nd ed., RCA Service Co., p. 17.